(12) United States Patent
Koseoglu

(10) Patent No.: US 10,920,157 B2
(45) Date of Patent: Feb. 16, 2021

(54) HYDROCRACKING PROCESS AND SYSTEM INCLUDING SEPARATION OF HEAVY POLY NUCLEAR AROMATICS FROM RECYCLE BY IONIC LIQUIDS AND SOLID ADSORBENTS

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/861,044

(22) Filed: Jan. 3, 2018

(65) Prior Publication Data

US 2018/0187100 A1 Jul. 5, 2018

Related U.S. Application Data

(60) Provisional application No. 62/442,228, filed on Jan. 4, 2017.

(51) Int. Cl.
*C10G 67/06* (2006.01)
*C10G 55/06* (2006.01)
(Continued)

(52) U.S. Cl.
CPC ............... *C10G 55/06* (2013.01); *B01D 3/14* (2013.01); *B01D 11/04* (2013.01); *C10G 7/00* (2013.01);
(Continued)

(58) Field of Classification Search
CPC ........ C10G 67/06; C10G 67/14; C10G 21/06; C10G 21/20; C10G 21/24; C10G 21/28
See application file for complete search history.

(56) References Cited

U.S. PATENT DOCUMENTS 4,170,544 A 10/1979 Miller
4,447,315 A 5/1984 Lamb et al.
(Continued)

FOREIGN PATENT DOCUMENTS

EP 2292572 A1 3/2011

OTHER PUBLICATIONS

PCT/US2018/012160, International Search Report and Written Opinion dated May 9, 2018, 12 pages.

*Primary Examiner* — Michelle Stein
(74) *Attorney, Agent, or Firm* — Abelman, Frayne & Schwab

(57) ABSTRACT

A process for the treatment of a hydrocracking unit bottoms recycle stream, and preferably the fresh hydrocracker feed to remove heavy poly-nuclear aromatic (HPNA) compounds and HPNA precursors employs, in the alternative, an adsorption step which removes most of the HPNA compounds followed by an ionic liquid extraction step to remove the remaining HPNA compounds, or a first ionic liquid extraction step which removes most of the HPNA compounds followed by an adsorption step to remove the remaining HPNA compounds. Ionic liquids of the general formula $Q^+A^-$ are identified for use in the process; organic polar solvents are identified for removal of the HPNA compounds in solution. Suitable adsorbents are identified for use in packed bed or slurry bed columns that operate within specified temperature and pressure ranges.

30 Claims, 6 Drawing Sheets

(51) Int. Cl.
  *B01D 3/14* (2006.01)
  *C10G 7/00* (2006.01)
  *C10G 21/20* (2006.01)
  *B01D 11/04* (2006.01)
  *C10G 21/24* (2006.01)
  *C10G 53/04* (2006.01)
  *C10G 67/14* (2006.01)
  *C10G 67/04* (2006.01)
  *C10G 53/08* (2006.01)

(52) U.S. Cl.
  CPC ............. *C10G 21/20* (2013.01); *C10G 21/24* (2013.01); *C10G 53/04* (2013.01); *C10G 53/08* (2013.01); *C10G 67/0445* (2013.01); *C10G 67/06* (2013.01); *C10G 67/14* (2013.01); *B01D 2253/20* (2013.01); *C10G 2300/1059* (2013.01); *C10G 2300/1096* (2013.01)

(56) References Cited

U.S. PATENT DOCUMENTS

| | | | |
|---|---|---|---|
| 2012/0187027 A1* | 7/2012 | Koseoglu | C10G 67/06 208/91 |
| 2015/0353847 A1* | 12/2015 | Yusuf | C10G 21/16 208/208 R |
| 2015/0361351 A1* | 12/2015 | Banerjee | C10G 21/20 208/57 |
| 2016/0108325 A1 | 4/2016 | Banerjee et al. | |

* cited by examiner

| HPNAs | Ring # | Structure |
|---|---|---|
| benzoperylene | 6 |  |
| coronene | 7 |  |
| methylcoronene | 7 |  |
| naphthenocoronene | 7 |  |
| dibenzocoronene | 9 |  |
| ovalene | 10 |  |

HYDROCRACKING PROCESS AND SYSTEM INCLUDING SEPARATION OF HEAVY POLY NUCLEAR AROMATICS FROM RECYCLE BY IONIC LIQUIDS AND SOLID ADSORBENTS

RELATED APPLICATIONS

This application claims priority to U.S. Provisional Patent Application No. 62/442,228 filed Jan. 4, 2017, the contents of which are incorporated herein by reference in their entireties.

BACKGROUND OF THE INVENTION

Field of the Invention

The present invention relates to hydrocracking processes, and in particular to hydrocracking processes including separation of heavy poly nuclear aromatics from recycle streams using ionic liquids and solid adsorbents.

Description of Related Art

Hydrocracking processes are used commercially in a large number of petroleum refineries. They are used to process a variety of feeds boiling in the range of about 370 to 520° C. in conventional hydrocracking units and boiling at 520° C. and above in the residue hydrocracking units. In general, hydrocracking processes split the molecules of the feed into smaller, i.e., lighter, molecules having higher average volatility and economic value. Additionally, hydrocracking processes typically improve the quality of the hydrocarbon feedstock by increasing the hydrogen to carbon ratio and by removing organosulfur and organonitrogen compounds. The significant economic benefit derived from hydrocracking processes has resulted in substantial development of process improvements and more active catalysts.

In addition to sulfur-containing and nitrogen-containing compounds, a typical hydrocracking feedstream, such as vacuum gas oil (VGO), contains small amount of poly nuclear aromatic (PNA) compounds, i.e., those containing less than seven fused benzene rings. As the feedstream is subjected to hydroprocessing at elevated temperature and pressure, heavy poly nuclear aromatic (HPNA) compounds, i.e., those containing seven or more fused benzene rings, tend to form and are present in high concentration in the unconverted hydrocracker bottoms. For this reason, PNA compounds are defined as the precursors of the HPNAs, and the amount and type of the precursors is generally related to the type of feed stock and its boiling range. The HPNAs foul process equipment and shorten catalyst life.

Heavy feedstreams such as demetalized oil (DMO) or deasphalted oil (DAO) have much higher concentrations of nitrogen, sulfur and PNA compounds than VGO feedstreams. These impurities can lower the overall efficiency of the hydrocracking unit by requiring higher operating temperatures, higher hydrogen partial pressure or additional reactor/catalyst volume. In addition, high concentrations of impurities can accelerate catalyst deactivation.

Three major hydrocracking process schemes include single-stage once through hydrocracking, series-flow hydrocracking with or without recycle, and two-stage recycle hydrocracking. Single-stage once through hydrocracking is the simplest of the hydrocracker configuration and typically occurs at operating conditions that are more severe than hydrotreating processes, and less severe than conventional full pressure hydrocracking processes. It uses one or more reactors for both treating steps and cracking reaction, so the catalyst must be capable of both hydrotreating and hydrocracking. This configuration is cost effective, but typically results in relatively low product yields (for example, a maximum conversion rate of about 60%). Single stage hydrocracking is often designed to maximize mid-distillate yield over a single or dual catalyst systems. Dual catalyst systems can be used in a stacked-bed configuration or in two different reactors. The effluents are passed to a fractionator column to separate the $H_2S$, $NH_3$, light gases ($C_1$-$C_4$), naphtha and diesel products boiling in the temperature range of 36-370° C. The hydrocarbons boiling above 370° C. are typically unconverted bottoms that, in single stage systems, are passed to other refinery operations, for example fluid catalytic cracking units.

Series-flow hydrocracking with or without recycle is one of the most commonly used configuration. It uses one reactor (containing both treating and cracking catalysts) or two or more reactors for both treating and cracking reaction steps. In a series-flow configuration the entire hydrocracked product stream from the first reaction zone, including light gases (typically $C_1$-$C_4$, $H_2S$, $NH_3$) and all remaining hydrocarbons, are sent to the second reaction zone. Unconverted bottoms from the fractionator column are recycled back into the first reactor for further cracking. This configuration converts heavy crude oil fractions, i.e., vacuum gas oil, into light products and has the potential to maximize the yield of naphtha, jet fuel, or diesel, depending on the recycle cut point used in the distillation section.

Two-stage recycle hydrocracking uses two reactors and unconverted bottoms from the fractionation column are passed to the second reactor for further cracking. Since the first reactor accomplishes both hydrotreating and hydrocracking, the feed to second reactor is virtually free of ammonia and hydrogen sulfide. This permits the use of high performance zeolite catalysts which are susceptible to poisoning by sulfur or nitrogen compounds.

A typical hydrocracking feedstock is a vacuum gas oil stream having a nominal boiling range of 370 to 565° C. DMO or DAO, alone or blended with vacuum gas oil, is processed in a hydrocracking unit. For instance, a typical hydrocracking unit processes vacuum gas oils that contain from 10V % to 25V % of DMO or DAO for optimum operation. Undiluted 100% DMO or DAO can also be processed, but typically under more severe conditions, since the DMO or DAO stream contains a greater percentage of nitrogen compounds, e.g., 2,000 ppmw vs. 1,000 ppmw, and a higher micro carbon residue (MCR) content than the VGO stream (10 W % vs. <1 W %).

DMO or DAO content in blended feedstocks to a hydrocracking unit can lower the overall efficiency of the unit by increasing the operating temperature or reactor/catalyst volume for existing units, or by increasing hydrogen partial pressure requirements or reactor/catalyst volume for grassroots units. These impurities can also reduce the quality of the desired intermediate hydrocarbon products in the hydrocracked effluent. When DMO or DAO are processed in a hydrocracker, further processing of hydrocracking reactor effluents may be required to meet the refinery fuel specifications, depending upon the refinery configuration. When the hydrocracking unit is operating in its desired mode, that is to say, discharging a high quality effluent product stream, its effluent can be utilized in blending and to produce gasoline, kerosene and diesel fuel to meet established fuel specifications.

Formation of HPNA compounds is an undesirable side reaction that occurs in recycle hydrocrackers. The HPNA molecules form by dehydrogenation of larger hydro-aromatic molecules or cyclization of side chains onto existing HPNA molecules followed by dehydrogenation, which is favored as the reaction temperature increases. HPNA formation depends on many known factors including the type of feedstock, catalyst selection, process configuration, and operating conditions. Since HPNA molecules accumulate in the recycle system and then cause equipment fouling, HPNA formation must be controlled in the hydrocracking process.

The rate of formation of the various HPNA compounds increases with higher inversion and heavier feed stocks. The fouling of equipment may not be apparent until large amounts of HPNA accumulate in the recycle liquid loop. The problem of HPNA formation is of universal concern to refiners and various removal methods have been developed by refinery operators to reduce its impact.

The prior art methods to separate or treat heavy polynuclear aromatics formed in the hydrocracking process include adsorption, hydrogenation, extraction, solvent deasphalting and purging, or "bleeding" a portion of the recycle stream from the system to reduce the build-up of HPNA compounds and cracking or utilizing the bleed stream elsewhere in the refinery. The hydrocracker bottoms are treated in separate units to eliminate the HPNA's and recycle HPNA-free bottoms back to the hydrocracking reactor.

As noted above, one alternative when operating the hydrocracking unit in the recycle mode is to purge a certain amount of the recycle liquid to reduce the concentration of HPNA compounds introduced with the fresh feed, although purging reduces the conversion rate to below 100%. Another solution to the build-up problem is to eliminate the HPNAs by passing them to a special purpose vacuum column which effectively fractionates 98-99% of the recycle stream leaving most of the HPNAs at the bottom of the column for rejection from the system as fractionator bottoms. This alternative incurs the additional capital cost and operating expenses of a dedicated fractionation column.

As used herein, the term hydrocracking unit recycle stream is synonymous with the terms hydrocracker recycle stream, hydrocracker bottoms, hydrocracker unconverted material and fractionator bottoms. As used herein, the shorthand expressions "HPNAs" means "Heavy Polynuclear Aromatics" and "HPNAs/HPNA precursors" and "HPNAs and HPNA precursors" means "HPNA compounds and HPNA precursors". "HPNAs" and "HPNA compounds" are used interchangeably. For convenience in the description that follows, it will be understood that a reference to HPNA compounds also includes HPNA precursors.

The problem therefore exists of providing a process for removing HPNA compounds from the bottoms recycle stream of a hydrocracking unit that is more efficient and cost effective than processes of the prior art.

SUMMARY OF THE INVENTION

In accordance with the process of the present invention, hydroprocessed bottoms fractions are treated to convert and separate HPNA compounds and produce a reduced-HPNA hydroprocessed bottoms stream effective for recycle, for instance, in a configuration of a single hydrocracking reactor, series flow once through hydrocracking unit operation, or two-stage hydrocracking unit operations.

The hydrocracking unit bottoms recycle stream, and preferably the fresh hydrocracking unit feed are treated in one of two alternative processes that employ both adsorption and extraction to remove HPNA compounds in two discrete steps. In one embodiment of the process, a first adsorption step removes most of the HPNA compounds and a second ionic liquid extraction step removes the remaining HPNA compounds from the hydrocracker bottoms recycle stream. In a second embodiment of the process, a first ionic liquid extraction step removes most of the HPNA compounds and a second adsorption step removes the remaining HPNA compounds from the bottoms recycle stream.

Embodiment 1: Adsorption Followed by Ionic Liquid Extraction

In this embodiment, the recycle stream is preferably combined with the fresh feed and the combined feedstream is sent to an adsorption column to remove HPNA compounds and HPNA precursors. The effluent from the adsorption column is then sent to an extractor to extract the remaining HPNA compounds and HPNA precursors with one or more ionic liquids. The extracted HPNAs and HPNA precursors together with ionic liquids are sent to a separator to separate the HPNAs and precursors using an organic polar solvent, and to recover the ionic liquids. The solvent is then recovered in a solvent recovery unit and recycled to the extractor. The treated stream having substantially no free HPNA compounds is then sent to a liquid-liquid separator to separate any remaining ionic liquids and HPNA compounds and to recover the HPNA-free stream.

Embodiment 2: Ionic Liquid Extraction Followed by Adsorption

In this embodiment, the recycle stream is preferably combined with the feedstream and sent to an extractor and mixed with one or more ionic liquids. The extracted HPNAs and HPNA precursors together with ionic liquids are sent to a separator to separate the HPNAs and precursors using an organic polar solvent, and to recover the ionic liquids. The solvent is then recovered in a solvent recovery unit and recycled to the extractor. The treated stream of reduced HPNA content is then sent to a liquid-liquid separator to separate any remaining ionic liquids and HPNA compounds and to recover the stream of reduced HPNA content. After separation of the ionic liquids and solvent, the treated hydrocarbon stream is sent to an adsorption column to remove the remaining HPNA compounds and HPNA precursors.

The above method for separation of HPNA compounds from a bottoms fraction can be integrated in a hydroprocessing operation using a single reactor or plural reactors in a "once through" configuration.

In addition, the above methods for separation of HPNAs from a bottoms fraction can be integrated in a two-stage hydroprocessing configuration.

Although the process has been described in connection with the treatment of the recycle stream of a hydrocracking unit, the treated stream containing no or a low concentration of HPNA compounds and/or HPNA precursors can alternatively be sent to an FCC unit.

HPNA Disposal

The HPNA compounds recovered by the combination of either of the extraction/adsorption steps described above can be further processed in a delayed coker to produce high quality coke, and/or can be gasified to produce hydrogen, steam and electricity, and/or can be sent to the fuel oil pool as blending components, and/or can be sent to a fluid catalytic cracking (FCC) unit to form a small portion of the FCC feedstream and eventually be deposited as coke on the catalyst, which coke will be burned to produce heat in the catalyst regeneration step, and/or can be sent to the asphalt pool.

In the practice of the alternative adsorption/extraction processes described above, it is preferred that metals in the feedstock be removed by pre-treatment in a hydrodemetallization (HDM) bed containing HDM catalyst that is of large pore volume and size. It will also be understood that sulfur and nitrogen compounds in the feed are removed in the first stage of the hydrocracking unit.

The ionic liquid can be a non-aqueous ionic liquid of the general formula $Q^+A^-$. The $A^-$ ion is selected from the group consisting of halide anions, nitrate, sulfate, phosphate, acetate, haloacetates, tetrafluoroborate, tetrachloroborate, hexafluorophosphate, hexafluoroantimonate, fluorosulfonate, alkyl sulfonates, perfluoroalkyl sulfonates, bis(perfluoroalkylsulfonyl)amides, tris-trifluoromethane-sulfononyl methylide of the formula $C(CF_3SO_2)_3{-}$, unsubstituted arenesulfonates, arenesulfonates substituted by halogen or haloalkyl groups, the tetraphenylborate anion and the tetraphenylborate anions having substituted aromatic cores.

The $Q^+$ ion can be any suitable ammonium cation, a phosphonium cation or a sulfonium cation. The quaternary ammonium and/or phosphonium $Q^+$ ion can be of the general formula $NR_1R_2R_3R_4+$ in which $R_1$, $R_2$, $R_3$ and $R_4$ are the same or different and are selected from hydrogen and hydrocarbon radicals having from 1 to 30 carbon atoms, with the exception of an $NH_4^+$ cation, and $PR_1R_2R_3R_4+$ in which $R_1$, $R_2$, $R_3$ and $R_4$ are the same or different and are selected from hydrogen and hydrocarbon radicals having from 1 to 30 carbon atoms.

The $Q^+$ ion can have the general formula $R_1R_2N{=}CR_3R_4^+$, wherein $R_1$, $R_2$, $R_3$ and $R_4$ are the same or different and are selected from hydrogen and hydrocarbon radicals having from 1 to 30 carbon atoms.

The $Q^+$ ion can have the general formula $R_1R_2P{=}CR_3R_4^+$, wherein $R_1$, $R_2$, $R_3$ and $R_4$ are the same or different and are selected from hydrogen and hydrocarbon radicals having from 1 to 30 carbon atoms.

The $Q^+$ ion can be a nitrogen-containing heterocyclic compound that includes 1, 2 or 3 nitrogen and atoms having cyclic compounds containing 4 to 10 atoms.

The $Q^+$ ion can have the general structural formula selected from the group consisting of the following structure, wherein $R_1$, $R_2$, $R_3$, $R_4$ and $R_5$ are the same or different and represent hydrogen or hydrocarbonyl radicals that have 1 to 30 carbon atoms.

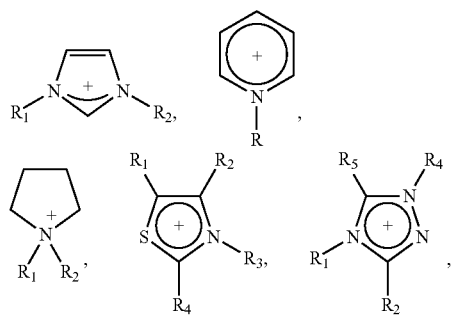
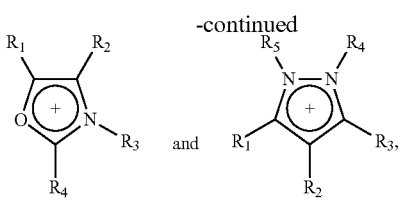

The $Q^+$ ion can be a phosphorous-containing compound.

The $Q^+$ ion can have the general structural formula selected from a group having the following structure.

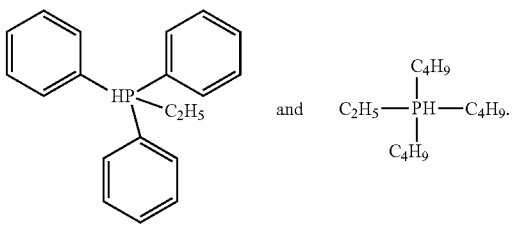

The $Q^+$ quaternary ammonium or phosphonium cations can also correspond to one of the following general structural formula:

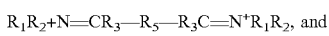

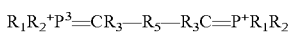

in which $R_1$, $R_2$ and $R_3$ are the same or different, and represent hydrogen or hydrocarbonyl radicals that have 1 to 30 carbon atoms and $R_5$ represents an alkylene radical or a phenylene radical.

The sulfonium cations can have the general formula:

where $R_1$, $R_2$ and $R_3$, are the same or different hydrocarbonyl radicals having 1 to 12 carbon atoms.

Ionic liquids particularly suitable for use in the process of the present invention include N-butyl-pyridinium hexafluorophosphate, N-ethyl-pyridinium tetrafluoroborate, pyridinium fluorosulfonate, butyl-3-methyl-1-imidazolium tetrafluoroborate, butyl-3-methyl-1-imidazolium bis-trifluoromethane-sulfonyl amide, triethylsulfonium bis-trifluoromethane-sulfonyl amide, butyl-3-methyl-1-imidazolium hexafluoro-antimonate, butyl-3-methyl-1-imidazolium hexafluorophosphate, butyl-3-methyl-1-imidazolium trifluoroacetate, butyl-3-methyl-1-imidazolium trifluoromethylsulfonate, butyl-3-methyl-1-imidazolium bis(trifluoromethylsulfonyl)-amide, trimethyl-phenylammonium hexafluorophosphate, tetrabutylphosphonium tetrafluoroborate, and their combinations.

The ionic liquid extraction process can be performed at a temperature in the range of 20° to 200° C. and at a pressure in the range of from 1 to 30 bars, and with a mole ratio of ionic liquid-to-HPNAs of from 1:1 to 10:1. The LHSV range can be from is 0.5-10 h−1.

Analogous processes are known for the treatment of the hydrocarbon effluents of hydrocracking units using ionic liquids to extract a variety of organosulfur and organonitrogen benzothiophene compounds based on their 6-member ring structures. Such processes are disclosed in U.S. Pat. No. 8,758,600 entitled "Ionic Liquid Desulfurization Process Incorporated in a Low Pressure Separator" and U.S. Pat. No. 8,992,767 entitled "Ionic Liquid Desulfurization Process Incorporated in a Contact Vessel", the disclosures of which are incorporated by reference herein in their entirety.

Suitable extractors include centrifugal contactors and contacting columns such as tray columns, spray columns, packed towers, rotating disc contactors and pulse columns.

Adsorption columns suitable for use in the process can be packed bed or slurry bed columns. The adsorption bed can operate in the temperature range of from 20°–200° C. and at a pressure in the range of from 1 to 30 bars.

Suitable adsorbents include natural clays and preferably attapulgus clay, alumina, silica, activated carbon, natural and synthetic zeolites, spent catalysts, silica-titania and titania, Suitable organic polar solvents for use in the process can be selected based on their Hildebrand solubility factors or on the basis of their two-dimensional solubility factors. The overall Hildebrand solubility parameter is a well-known measure of polarity and has been calculated for numerous compounds. See *Journal of Paint Technology*, Vol. 39, No. 505 (February 1967). The solvents can also be selected based on their two-dimensional solubility parameter comprising the complexing solubility parameter and the field force solubility parameter. See, for example, I. A. Wiehe, *Ind. & Eng. Res.*, 34(1995), 661. The complexing solubility parameter component, which describes the hydrogen bonding and electron donor-acceptor interactions, measures the interaction energy that requires a specific orientation between an atom of one molecule and a second atom of a different molecule. The field force solubility parameter, which describes the van der Waals and dipole interactions, measures the interaction energy of the liquid that is not destroyed by changes in the orientation of the molecules. The polar solvents are further defined as having an overall solubility parameter greater than about 8.5 or a complexing solubility parameter of greater than 1 and field force parameter of greater than 8. Examples of polar solvents meeting the desired minimum solubility parameter are toluene (8.91), benzene (9.15), xylenes (8.85), and tetrahydrofuran (9.52). The preferred polar solvents used in the examples that follow are toluene and tetrahydrofuran.

BRIEF DESCRIPTION OF THE DRAWINGS

The invention will be described in further detail below and with reference to the attached drawings in which the same or similar elements are referred to by the same number, and where.

DETAILED DESCRIPTION OF THE INVENTION

Integrated processes and systems are provided to improve efficiency of hydrocracking operations. The processes and systems described below are effective for treating a wide range of initial feedstocks obtained from various sources, such as one or more of straight run vacuum gas oil, treated vacuum gas oil, demetalized oil from a solvent demetalizing operations, deasphalted oil from a solvent deasphalting operations, coker gas oils from coker operations, cycle oils from fluid catalytic cracking operations including heavy cycle oil, and visbroken oils from visbreaking operations. The feedstream generally has a boiling point of from about 350 to 800° C., 350 to 700° C., 350 to 600° C., or 350 to 565° C.

As used herein, "HPNA compounds" refers to fused polycyclic aromatic compounds having seven or more rings, for example, including but not limited to coronenes ($C_{24}H_{12}$), benzocoronenes ($C_{28}H_{14}$), dibenzocorone ($C_{32}H_{16}$) and ovalenes ($C_{32}H_{14}$). The seven ring aromatic molecule, coronene, is shown below. The aromatic structure may have alkyl groups or naphthenic rings attached to it. Coronene has 24 carbon atoms and 12 hydrogen atoms. Its double bond equivalency (DBE) is 19. DBE is calculated based on the sum of the number double bonds and number of rings. For example, the DBE value for coronene is 19, e.g., 7 rings+12 double bonds. HPNA compounds generally have DBE values of 17 and above.

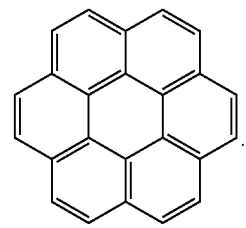

(1)

Single Reactor with Recycle

Figure 1:
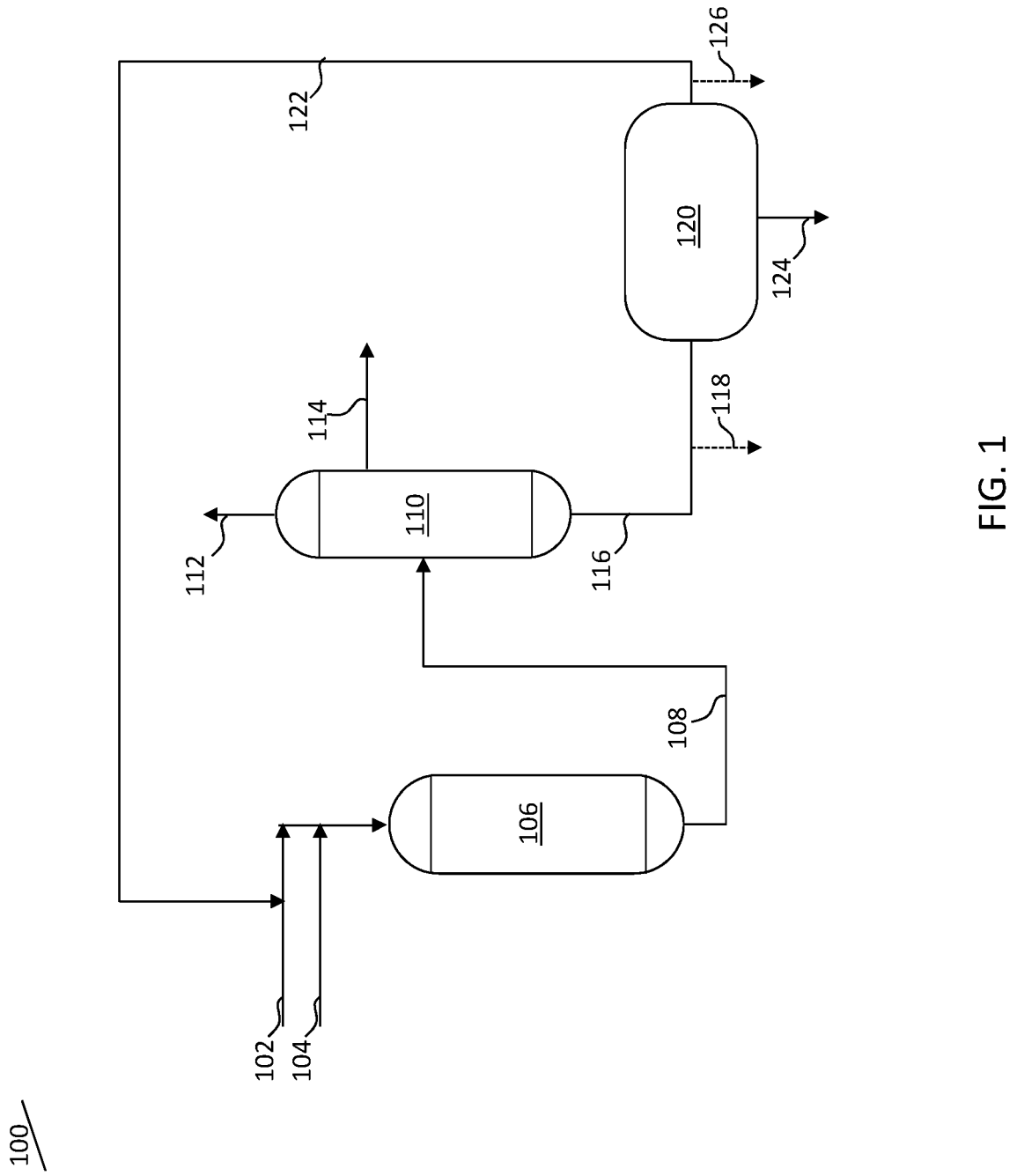
FIG. 1 is a process flow diagram of an embodiment of an integrated hydrocracking unit operation.

FIG. 1 is a process flow diagram of an embodiment of an integrated hydroprocessing system 100 that includes a reaction zone 106, a fractionating zone 110, and an HPNA separation zone 120.

Reaction zone 106 generally includes one or more inlets in fluid communication with a source of initial feedstock 102, a source of hydrogen gas 104, and the HPNA separation zone 120 to receive a recycle stream comprising all or a portion of a bottoms stream 116. One or more outlets of reaction zone 106 that discharge effluent stream 108 is in fluid communication with one or more inlets of the fractionating zone 110, optionally having one or more high pressure and low pressure separation stages (not shown) for recovery of recycle hydrogen.

Fractionating zone 110 includes one or more outlets for discharging gases 112, typically $H_2$, $H_2S$, $NH_3$, and light hydrocarbons ($C_1$-$C_4$); one or more outlets for recovering product 114, such as naphtha and diesel products boiling in the temperature range of 36-370° C.; and one or more outlets for discharging bottoms 116 including hydrocarbons boiling above about 370° C. In certain embodiments, the temperature cut point for bottoms 116 and, correspondingly, the end point for the products 114 is a range corresponding to the upper temperature limit of the desired gasoline, kerosene and/or diesel product boiling point ranges for downstream operations.

The fractionator bottoms outlet 116 is in fluid communication with the HPNA separation zone 120 described herein, which generally includes an outlet for discharging HPNA-reduced fractionator bottoms 122 and an outlet for discharging a HPNAs/HPNA precursors stream 124 containing HPNA compounds. The outlet discharging HPNA-reduced fractionator bottoms 122 is in fluid communication with one or more inlets of reaction zone 106 for recycle of all or a portion of the stream. In certain embodiments, a bleed stream 118 is drawn from bottoms 116 upstream of the HPNA separation zone 120. In additional embodiments, a bleed stream 126 is drawn from HPNA-reduced fractionator bottoms 122 downstream of the HPNA separation zone 120, in addition to or instead of bleed stream 118. Either or both of these bleed streams are hydrogen-rich and therefore can be effectively integrated with certain fuel oil pools, or serve as feed to fluidized catalytic cracking or steam cracking processes (not shown).

In operation of the system 100, a feedstock stream 102 and a hydrogen stream 104 are charged to the reaction zone 106. Hydrogen stream 104 provides a quantity of hydrogen that is effective to support the requisite degree of hydrocracking, feed type, and other factors, and can be any combination including make-up hydrogen, recycle hydrogen from optional gas separation subsystems (not shown) between reaction zone 106 and fractionating zone 110, and/or derived from fractionator gas stream 112. Reaction effluent stream 108, after one or more optional high pressure and low pressure separation stages to recover recycle hydrogen, contains converted, partially converted and unconverted hydrocarbons, which includes HPNA compounds formed in the reaction zone 106.

The reaction effluent stream 108 is passed to fractionating zone 110, to recover gas and liquid products and by-products 112, 114, and to separate a bottoms fraction 116 containing HPNA compounds. Gas stream 112, typically containing $H_2$, $H_2S$, $NH_3$, and light hydrocarbons ($C_1$-$C_4$), is discharged and recovered and can be further processed as is known in the art, including for recovery of recycle hydrogen. One or more cracked product streams 114 are discharged from appropriate outlets of the fractionator and can be further processed and/or blended in downstream refinery operations to produce gasoline, kerosene and/or diesel fuel, or other petrochemical products. In certain embodiments (not shown), fractionating zone 110 can operate as a flash vessel to separate heavy components at a suitable cut point, for example, a range corresponding to the upper temperature range of the desired gasoline, kerosene and/or diesel products for downstream operations. In certain embodiments, a suitable cut point is in the range of 350 to 450° C., 360 to 450° C., 370 to 450° C., 350 to 400° C., 360 to 400° C., 370 to 400° C., 350 to 380° C., or 360 to 380° C.

All or a portion of the fractionator bottoms stream 116 derived from the reaction effluent, including HPNA compounds formed in the reaction zone 106, is passed to the HPNA separation zone 120 for treatment. In certain embodiments, a portion of the fractionator bottoms from the reaction effluent is removed as bleed stream 118. Bleed stream 118 can be about 0-10 V %, 1-10 V %, 1-5 V % or 1-3 V % of the fractionator bottoms 116. The concentration of HPNA compounds in the hydroprocessed effluent fractionator bottoms is reduced in the HPNA separation zone 120 to produce the HPNA-reduced fractionator bottoms stream 122 that is recycled to the reaction zone 106. In certain embodiments, instead of, or in conjunction with bleed stream 118, a portion of the HPNA-reduced fractionator bottoms stream 122 is removed from the recycle loop as bleed stream 126. Bleed stream 126 can be about 0-10 V %, 1-10 V %, 1-5 V % or 1-3 V % of the HPNA-reduced fractionator bottoms stream 122. A discharge stream 124 containing HPNA compounds is removed from the HPNA separation zone 120.

Reaction zone 106 can contain one or more fixed-bed, ebullated-bed, slurry-bed, moving bed, continuous stirred tank (CSTR), or tubular reactors, in series and/or parallel arrangement. The reactor(s) are generally operated under conditions effective for the desired degree of conversion, particular type of reactor, the feed characteristics, and the desired product slate. For instance, these conditions can include a reaction temperature in the range of from about 300 to 500° C., 330 to 500° C., 300 to 475° C., 330 to 475° C., 300 to 475° C. or 330 to 450° C.; a reaction pressure in the range of from about 60 to 300 bar, 60 to 200 bar, 60 to 180 bar, 100 to 300 bar, 100 to 200 bar, 100 to 180 bar, 130 to 300 bar, 130 to 200 bar, or 130 to 180 bar; a hydrogen feed rate up to about 2500 standard liters per liter of hydrocarbon feed (SLt/Lt), in certain embodiments from about 800 to 2000 SLt/Lt, 800 to 1500 SLt/Lt, 1000 to 2000 SLt/Lt, or 1000 to 1500 SLt/Lt; and a feed rate in the range of from about 0.1 to 10 $h^{-1}$, 0.1 to 5 $h^{-1}$, 0.1 to 2 $h^{-1}$, 0.25 to 10 $h^{-1}$, 0.25 to 5 $h^{-1}$, 0.25 to 2 $h^{-1}$, 0.5 to 10 $h^{-1}$, 0.5 to 5 $h^{-1}$, or 0.5 to 2 $h^{-1}$.

In systems using relatively lower hydrogen partial pressure values, HPNA compounds have relatively greater tendency accumulate due to the unavailability of hydrogen for cracking reactions. The operator typically must balance the accumulation of HPNA compounds against the higher cost of increased hydrogen consumption. However, when HPNA compounds in the recycle are removed as in the present process, the catalyst lifecycle can be increased.

The catalyst used in the reaction zone 106 contains one or more active metal components selected from IUPAC Groups 6-10 of the Periodic Table of the Elements. In certain embodiments the active metal component is one or more of cobalt, nickel, tungsten and molybdenum. The active metal component(s) are typically deposited or otherwise incorporated on a support, which can be amorphous and/or structured, such as alumina, silica-alumina, silica, titania, titania-silica, titania-silicates or zeolites. In embodiments using zeolite-based catalysts, HPNA compounds have relatively greater tendency to accumulate in the recycle stream due to the inability for these larger molecules to diffuse into the catalyst pore structure, particularly at relatively lower hydrogen partial pressure levels in the reactor. However, according to the process herein, by removing HPNA compounds from the recycle stream, the lifecycle of such zeolite catalyst is increased.

Series-Flow with Recycle

Figure 2:
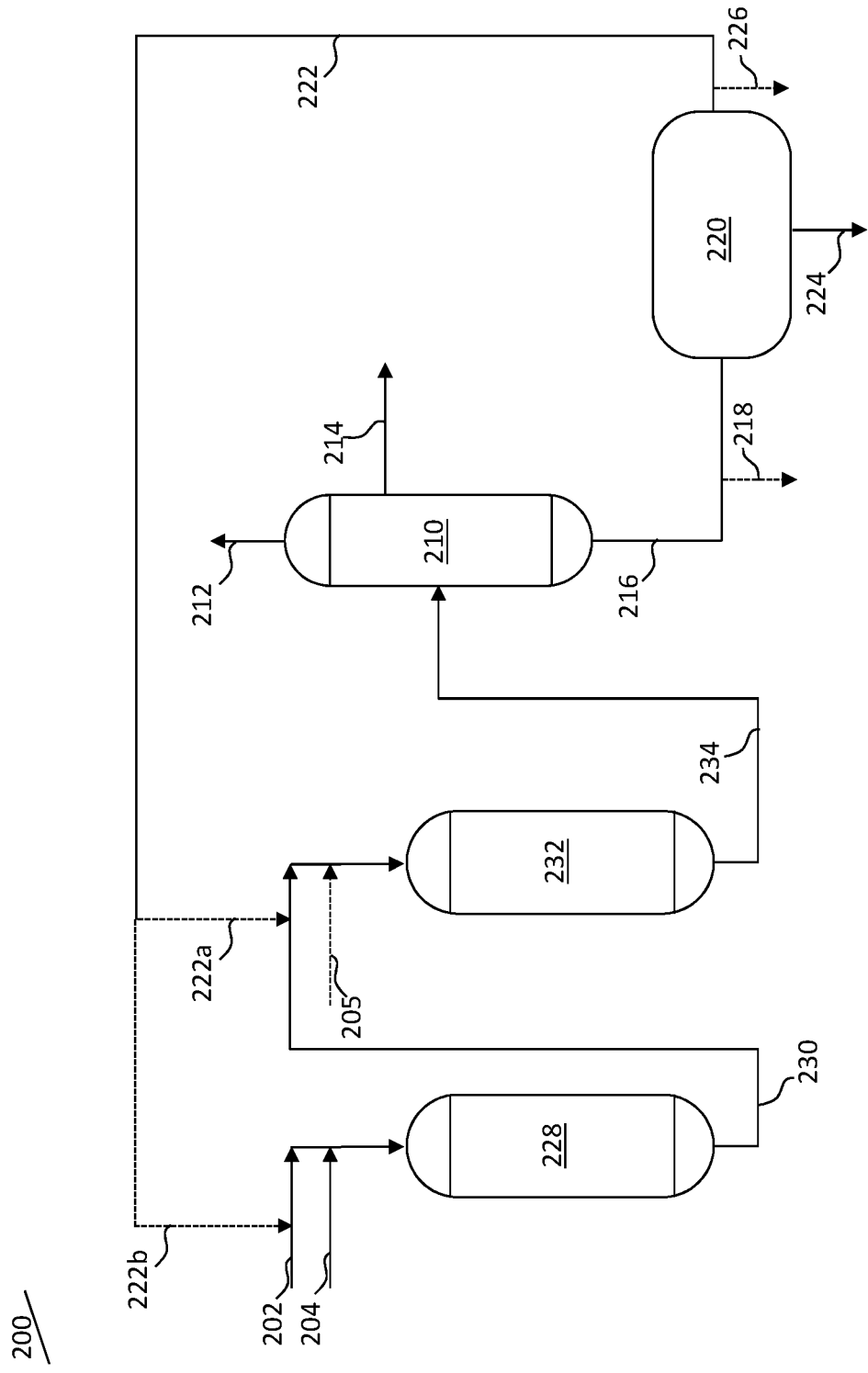
FIG. 2 is a process flow diagram of an integrated series-flow hydroprocessing system.

FIG. 2 is a process flow diagram of another embodiment of an integrated hydrocracking unit operation, system 200, which operates as series-flow hydrocracking system with recycle to the first reaction zone, the second reaction zone, or both the first and second reaction zones. In general, system 200 includes a first reaction zone 228, a second reaction zone 232, a fractionating zone 210, and an HPNA separation zone 220.

First reaction zone 228 generally includes one or more inlets in fluid communication with a source of initial feedstock 202, a source of hydrogen gas 204, and optionally the HPNA separation zone 220 to receive a recycle stream comprising all or a portion of the HPNA-reduced reaction zone bottoms stream 222. One or more outlets of the first reaction zone 228 that discharge effluent stream 230 is in fluid communication with one or more inlets of the second reaction zone 232. In certain embodiments, the effluents 230 are passed to the second reaction zone 232 without separation of any excess hydrogen and light gases. In optional embodiments, one or more high pressure and low pressure separation stages are provided between the first and second reaction zones 228, 232 for recovery of recycle hydrogen (not shown).

The second reaction zone 232 generally includes one or more inlets in fluid communication with one or more outlets of the first reaction zone 228, optionally a source of additional hydrogen gas 205 and optionally the HPNA separation zone 220 to receive a recycle stream comprising all or a portion of the HPNA-reduced reaction zone bottoms stream 222. One or more outlets of the second reaction zone 232 that discharge effluent stream 234 is in fluid communication with one or more inlets of the fractionating zone 210 (optionally having one or more high pressure and low pressure separation stages therebetween for recovery of recycle hydrogen, not shown).

Fractionating zone 210 includes one or more outlets for discharging gases 212, typically $H_2S$, $NH_3$, and light hydrocarbons ($C_1$-$C_4$); one or more outlets for recovering product 214, such as naphtha and diesel products boiling in the temperature range of 36-370° C.; and one or more outlets for discharging bottoms 216 including hydrocarbons boiling above about 370° C. In certain embodiments, the temperature cut point for bottoms 216 (and correspondingly the end point for the products 214) is in the range of 350 to 400° C. or 360 to 400° C.

The fractionating zone 210 bottoms outlet is in fluid communication with the HPNA separation zone 220 described herein, which generally includes an outlet for discharging HPNA-reduced fractionator bottoms 222 and an outlet for discharging a stream 224 containing HPNA compounds. The outlet discharging HPNA-reduced fractionator bottoms 222 is in fluid communication with one or more inlets of reaction zone 228 and/or 232 for recycle of all or a portion of the stream. In certain embodiments, a bleed stream 218 is drawn from bottoms 216 upstream of the HPNA separation zone 220. In additional embodiments, a bleed stream 226 is drawn from HPNA-reduced fractionator bottoms 222 downstream of the HPNA separation zone 220, in addition to or instead of bleed stream 218. Either or both of these bleed streams are hydrogen-rich and therefore can be effectively integrated with certain fuel oil pools, or serve as feed to fluidized catalytic cracking or steam cracking processes (not shown).

In operation of the system 200, a feedstock stream 202 and a hydrogen stream 204 are charged to the first reaction zone 228. Hydrogen stream 204 includes an effective quantity of hydrogen to support the requisite degree of hydrocracking, feed type, and other factors, and can be any combination including make-up hydrogen, recycle hydrogen from optional gas separation subsystems (not shown) between reaction zones 228 and 232, recycle hydrogen from optional gas separation subsystems (not shown) between reaction zone 232 and fractionator 210, and/or derived from fractionator gas stream 212. First reaction zone 228 operates under effective conditions for production of reaction effluent stream 230 (optionally after one or more high pressure and low pressure separation stages to recover recycle hydrogen) which is passed to the second reaction zone 232, optionally along with an additional hydrogen stream 205. Second reaction zone 232 operates under conditions effective for production of the reaction effluent stream 234, which contains converted, partially converted and unconverted hydrocarbons. The reaction effluent stream further includes HPNA compounds that were formed in the reaction zones 228 and/or 232.

The reaction effluent stream 234 is passed to fractionation zone 210, generally to recover gas and liquid products and by-products, and separate a bottoms fraction containing HPNA compounds. Gas stream 212, typically containing $H_2$, $H_2S$, $NH_3$, and light hydrocarbons ($C_1$-$C_4$), is discharged and recovered and can be further processed as is known in the art, including for recovery of recycle hydrogen. One or more cracked product streams 214 are discharged appropriate outlets of the fractionator and can be further processed and/or blended in downstream refinery operations to produce gasoline, kerosene and/or diesel fuel, or other petrochemical products. In certain embodiments (not shown), fractionating zone 210 can operate as a flash vessel to separate heavy components at a suitable cut point, for example, a range corresponding to the upper temperature range of the desired gasoline, kerosene and/or diesel products for downstream operations. In certain embodiments, a suitable cut point is in the range of 350 to 450° C., 360 to 450° C., 370 to 450° C., 350 to 400° C., 360 to 400° C., 370 to 400° C., 350 to 380° C., or 360 to 380° C.

All or a portion of the fractionator bottoms stream 216 from the reaction effluent, including HPNA compounds formed in the reaction zones 228 and/or 232, is passed to the HPNA separation zone 220 for treatment. In certain embodiments, a portion of the fractionator bottoms from the reaction effluent is removed as bleed stream 218. Bleed stream 218 can be about 0-10 V %, 1-10 V %, 1-5 V % or 1-3 V % of the fractionator bottoms 216. The concentration of HPNA compounds in the fractionator bottoms is reduced in the HPNA separation zone 220 to produce the HPNA-reduced fractionator bottoms stream 222. A discharge stream 224 containing HPNA compounds is removed from the HPNA separation zone 220. In certain embodiments, instead of or in conjunction with bleed stream 218, a portion of the HPNA-reduced fractionator bottoms stream 222 is removed from the recycle loop as bleed stream 226. Bleed stream 226 can be about 0-10 V %, 1-10 V %, 1-5 V % or 1-3 V % of the HPNA-reduced fractionator bottoms stream 222.

Accordingly, all or a portion of the HPNA-reduced fractionator bottoms stream 222 is recycled to the second reaction zone 232 as stream 222a, the first reaction zone 228 as stream 222b, or both the first and second reaction zones 228 and 232. For instance, stream 222b comprises 0 to 100 V %, in certain embodiments 0 to about 80 V %, and in further embodiments 0 to about 50 V % of stream 222 which is recycled to zone 228, and stream 222a comprises 0 to 100 V %, in certain embodiments 0 to about 80 V %, and in further embodiments 0 to about 50 V % of stream 222 is recycled to zone 232.

First reaction zone 228 can contain one or more fixed-bed, ebullated-bed, slurry-bed, moving bed, continuous stirred tank (CSTR), or tubular reactors, in series and/or parallel arrangement. The reactor(s) are generally operated under conditions effective for the desired degree of conversion in the first reaction zone 228, the particular type of reactor, the feed characteristics, and the desired product slate. For instance, these conditions can include a reaction temperature in the range of from about 300 to 500° C., 330 to 500° C., 300 to 475° C., 330 to 475° C., 300 to 475° C. or 330 to 450° C.; a reaction pressure in the range of from about 60 to 300 bar, 60 to 200 bar, 60 to 180 bar, 100 to 300 bar, 100 to 200 bar, 100 to 180 bar, 130 to 300 bar, 130 to 200 bar, or 130 to 180 bar; a hydrogen feed rate up to about 2500 SLt/Lt, in certain embodiments from about 800 to 2000 SLt/Lt, 800 to 1500 SLt/Lt, 1000 to 2000 SLt/Lt, or 1000 to 1500 SLt/Lt; and a feed rate in the range of from about 0.1 to 10 $h^{-1}$, 0.1 to 5 h$^{-1}$, 0.1 to 2 h$^{-1}$, 0.25 to 10 h$^{-1}$, 0.25 to 5 h$^{-1}$, 0.25 to 2 h$^{-1}$, 0.5 to 10 h$^{-1}$, 0.5 to 5 h$^{-1}$, or 0.5 to 2 h$^{-1}$.

The catalyst used in the first reaction zone 228 contains one or more active metal components selected from the Periodic Table of the Elements IUPAC Groups 6-10. In certain embodiments, the active metal component is one or more of cobalt, nickel, tungsten and molybdenum. The active metal component(s) are typically deposited or otherwise incorporated on a support, which can be amorphous and/or structured, such as alumina, silica alumina, silica, titania, titania-silica, titania-silicate or zeolites. In embodiments using zeolite-based catalysts, HPNA compounds have relatively greater tendency to accumulate in the recycle stream due to the inability for these larger molecules to diffuse into the catalyst pore structure, particularly at relatively lower hydrogen partial pressure levels in the reactor. However, according to the process herein, by removing HPNA compounds from the recycle stream in embodiments where HPNA-reduced bottoms are recycled to the first reaction zone 228, the lifecycle of such zeolite catalyst is increased.

Second reaction zone 232 can contain one or more fixed-bed, ebullated-bed, slurry-bed, moving bed, continuous stirred tank (CSTR), or tubular reactors, in series and/or parallel arrangement. The reactor(s) are generally operated under conditions effective for the particular type of reactor, the feed characteristics, and the desired product slate. For instance, these conditions can include a reaction temperature in the range of from about 300 to 500° C., 330 to 500° C., 300 to 475° C., 330 to 475° C., 300 to 475° C. or 330 to 450° C.; a reaction pressure in the range of from about 60 to 300 bar, 60 to 200 bar, 60 to 180 bar, 100 to 300 bar, 100 to 200 bar, 100 to 180 bar, 130 to 300 bar, 130 to 200 bar, or 130 to 180 bar; a hydrogen feed rate up to about 2500 SLt/Lt, in certain embodiments from about 800 to 2000 SLt/Lt, 800 to 1500 SLt/Lt, 1000 to 2000 SLt/Lt, or 1000 to 1500 SLt/Lt; and a feed rate in the range of from about 0.1 to 10 h$^{-1}$, 0.1 to 5 h$^{-1}$, 0.1 to 2 h$^{-1}$, 0.25 to 10 h$^{-1}$, 0.25 to 5 h$^{-1}$, 0.25 to 2 h$^{-1}$, 0.5 to 10 h$^{-1}$, 0.5 to 5 h$^{-1}$, or 0.5 to 2 h$^{-1}$.

The catalyst used in the second reaction zone 232 contains one or more active metal components selected from the Periodic Table of the Elements IUPAC Group 6-10. In certain embodiments, the active metal component is one or more of cobalt, nickel, tungsten and molybdenum. In embodiments in which the first reaction zone reduces contaminants such as sulfur and nitrogen, so that hydrogen sulfide and ammonia are minimized in the second reaction zone, active metal components effective as hydrogenation catalysts can include one or more noble metals such as platinum or palladium, alone or in combination with other active metals. The active metal component(s) are typically deposited or otherwise incorporated on a support, which can be amorphous and/or structured, such as alumina, silica alumina, silica, titania, titania-silica, titania-silicates or zeolites.

In embodiments using zeolite-based catalysts, HPNA compounds have relatively greater tendency to accumulate in the recycle stream due to the inability for these larger molecules to diffuse into the catalyst pore structure, particularly at relatively lower hydrogen partial pressure levels in the reactor. However, according to the process herein, by removing HPNA compounds from the recycle stream in embodiments where HPNA-reduced bottoms are recycled to the second reaction zone 232, the lifecycle of such zeolite catalyst is increased.

Two-Stage with Recycle

Figure 3:
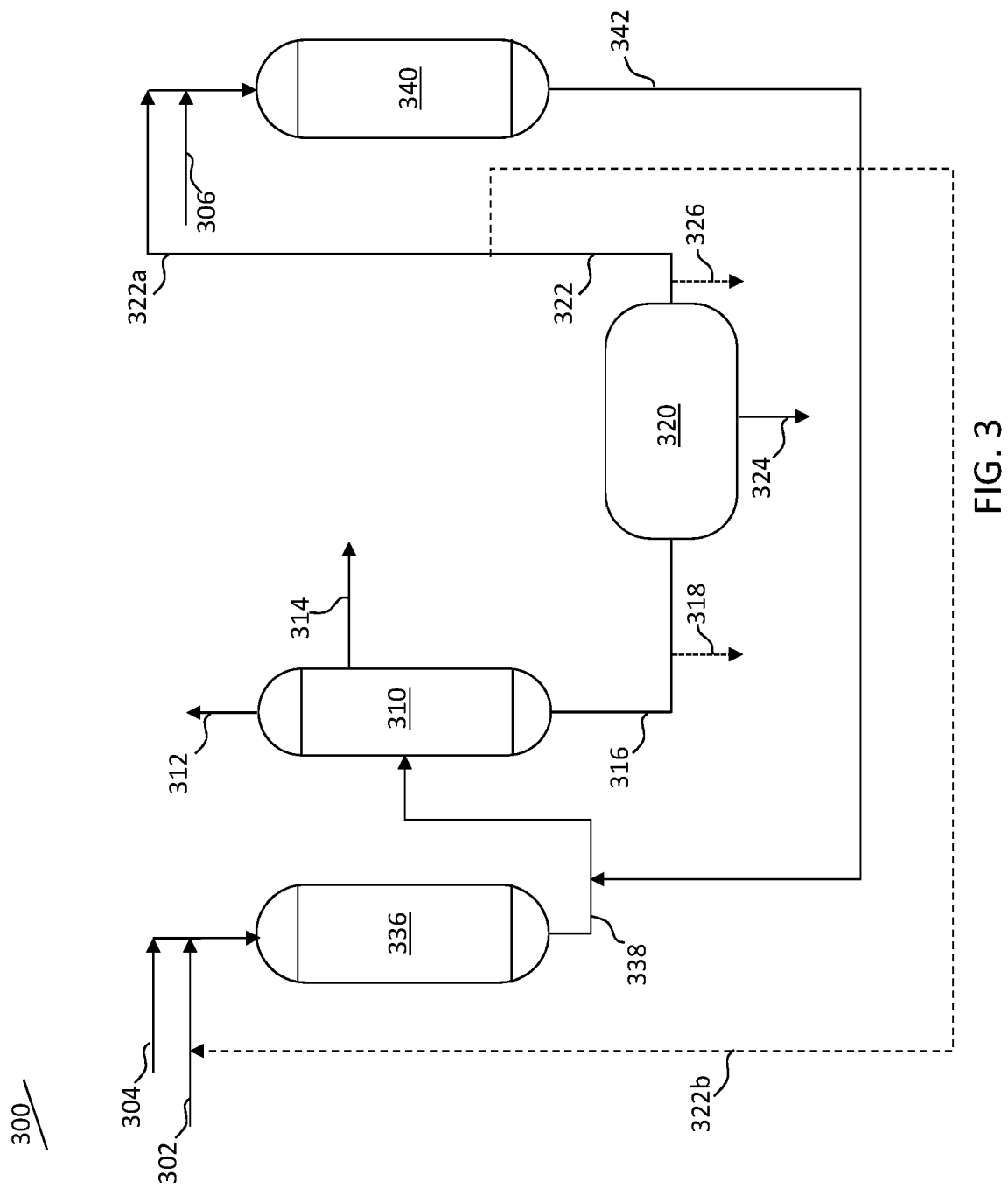
FIG. 3 is a process flow diagram of an integrated two-stage hydro hydroprocessing system with recycle.

FIG. 3 is a process flow diagram of another embodiment of an integrated hydrocracking unit operation, system 300, which operates as two-stage hydrocracking system with recycle. In general, system 300 includes a first reaction zone 336, a second reaction zone 340, a fractionating zone 310, and an HPNA separation zone 320.

First reaction zone 336 generally includes one or more inlets in fluid communication with a source of initial feedstock 302 and a source of hydrogen gas 304. One or more outlets of the first reaction zone 336 that discharge effluent stream 338 is in fluid communication with one or more inlets of the fractionating zone 310 (optionally having one or more high pressure and low pressure separation stages therebetween for recovery of recycle hydrogen, not shown).

Fractionating zone 310 includes one or more outlets for discharging gases 312, typically $H_2S$, $NH_3$, and light hydrocarbons ($C_1$-$C_4$); one or more outlets for recovering product 314, such as naphtha and diesel products boiling in the temperature range of 36-370° C.; and one or more outlets for discharging bottoms 316 including hydrocarbons boiling above about 370° C. In certain embodiments, the temperature cut point for bottoms 316 (and correspondingly the end point for the products 314) is a range corresponding to the upper temperature limit of the desired gasoline, kerosene and/or diesel product boiling point ranges for downstream operations.

The fractionating zone 310 bottoms outlet is in fluid communication with the HPNA separation zone 320 described herein, which generally includes an outlet for discharging HPNA-reduced fractionator bottoms 322 and an outlet for discharging a stream 324 containing HPNA compounds. The outlet discharging HPNA-reduced fractionator bottoms 322 is in fluid communication with one or more inlets of the second reaction zone 340 for recycle of all or a portion 322a of the recycle stream 322. In certain optional embodiments (as indicated by dashed lines in FIG. 3), a portion 322b is in fluid communication with one or more inlets of the first reaction zone 336. In certain embodiments, a bleed stream 318 is drawn from bottoms 316 upstream of the HPNA separation zone 320. In additional embodiments, a bleed stream 326 is drawn from HPNA-reduced fractionator bottoms 322 downstream of the HPNA separation zone 320, in addition to or instead of bleed stream 318. Either or both of these bleed streams are hydrogen-rich and therefore can be effectively integrated with certain fuel oil pools, or serve as feed to fluidized catalytic cracking or steam cracking processes (not shown).

Second reaction zone 340 generally includes one or more inlets in fluid communication with one or more outlets of the HPNA separation zone 320 for receiving HPNA-reduced fractionator bottoms 322 and a source of hydrogen gas 306. One or more outlets of the second reaction zone 340 that discharge effluent stream 342 are in fluid communication with one or more inlets of the fractionating zone 310 (optionally having one or more high pressure and low pressure separation stages therebetween for recovery of recycle hydrogen, not shown).

In operation of the system 300, a feedstock stream 302 and a hydrogen stream 304 are charged to the first reaction zone 336. Hydrogen stream 304 includes an effective quantity of hydrogen to support the requisite degree of hydrocracking, feed type, and other factors, and can be any combination including make-up hydrogen, recycle hydrogen from optional gas separation subsystems (not shown) between first reaction zone 336 and fractionating zone 310, recycle hydrogen from optional gas separation subsystems (not shown) between second reaction zone 340 and fractionating zone 310, and/or derived from fractionator gas stream 312. First reaction zone 336 operates under effective conditions for production of reaction effluent stream 338 (optionally after one or more high pressure and low pressure separation stages to recover recycle hydrogen) which is passed to the fractionating zone 310.

The reaction effluent stream 338 is passed to fractionation zone 310, generally to recover gas and liquid products and byproducts, and separate a bottoms fraction containing HPNA compounds. Gas stream 312, typically containing $H_2$, $H_2S$, $NH_3$, and light hydrocarbons ($C_1$-$C_4$), is discharged and recovered and can be further processed as is known in the art, including for recovery of recycle hydrogen. One or more cracked product streams 314 are discharged appropriate outlets of the fractionator and can be further processed and/or blended in downstream refinery operations to produce gasoline, kerosene and/or diesel fuel, or other petrochemical products. In certain embodiments (not shown), fractionating zone 310 can operate as a flash vessel to separate heavy components at a suitable cut point, for example, a range corresponding to the upper temperature range of the desired gasoline, kerosene and/or diesel products for downstream operations. In certain embodiments, a suitable cut point is in the range of 350 to 450° C., 360 to 450° C., 370 to 450° C., 350 to 400° C., 360 to 400° C., 370 to 400° C., 350 to 380° C., or 360 to 380° C.

All or a portion of the fractionator bottoms stream 316 from the reaction effluent, including HPNA compounds formed in the first reaction zone 336, is passed to the HPNA separation zone 320 for treatment. In certain embodiments, a portion of the fractionator bottoms from the reaction effluent is removed as bleed stream 318. Bleed stream 318 can be about 0-10 V %, 1-10 V %, 1-5 V % or 1-3 V % of the fractionator bottoms 316. The concentration of HPNA compounds in the fractionator bottoms is reduced in the HPNA separation zone 320 to produce the HPNA-reduced fractionator bottoms stream 322. A discharge stream 324 containing HPNA compounds is removed from the HPNA separation zone 320. In certain embodiments, instead of or in conjunction with bleed stream 318, a portion of the HPNA-reduced fractionator bottoms stream 322 is removed from the recycle loop as bleed stream 326. Bleed stream 326 can be about 0-10 V %, 1-10 V %, 1-5 V % or 1-3 V % of the HPNA-reduced fractionator bottoms stream 322.

Accordingly, all or a portion of the HPNA-reduced fractionator bottoms stream 322 is passed to the second reaction zone 340 as stream 322*a*. In certain embodiments, all or a portion of the HPNA-reduced fractionator bottoms stream 322 is recycled to the second reaction zone 340 as stream 322*a*, the first reaction zone 336 as stream 322*b*, or both the first and second reaction zones 336 and 340. For instance, stream 322*b* which is recycled to zone 336 comprises 0 to 100 V %, 0 to about 80 V %, or 0 to about 50 V % of stream 322, and stream 322*a* which is recycled to zone 340 comprises 0 to 100 V %, 0 to about 80 V %, or 0 to about 50 V % of stream 322 is recycled to zone 340.

Second reaction zone 340 operates under conditions effective for production of the reaction effluent stream 342, which contains converted, partially converted and unconverted hydrocarbons. The second stage the reaction effluent stream 342 is passed to the fractionating zone 310, optionally through one or more gas separators to recovery recycle hydrogen and remove certain light gases First reaction zone 336 can contain one or more fixed-bed, ebullated-bed, slurry-bed, moving bed, continuous stirred tank (CSTR), or tubular reactors, in series and/or parallel arrangement. The reactor(s) are generally operated under conditions effective for the degree of conversion in the first reaction zone 336, the particular type of reactor, the feed characteristics, and the desired product slate. For instance, these conditions can include a reaction temperature in the range of from about 300 to 500° C., 330 to 500° C., 300 to 475° C., 330 to 475° C., 300 to 475° C. or 330 to 450° C.; a reaction pressure in the range of from about 60 to 300 bar, 60 to 200 bar, 60 to 180 bar, 100 to 300 bar, 100 to 200 bar, 100 to 180 bar, 130 to 300 bar, 130 to 200 bar, or 130 to 180 bar; a hydrogen feed rate up to about 2500 SLt/Lt, in certain embodiments from about 800 to 2000 SLt/Lt, 800 to 1500 SLt/Lt, 1000 to 2000 SLt/Lt, or 1000 to 1500 SLt/Lt; and a feed rate in the range of from about 0.1 to 10 $h^{-1}$, 0.1 to 5 $h^{-1}$, 0.1 to 2 $h^{-1}$, 0.25 to 10 $h^{-1}$, 0.25 to 5 $h^{-1}$, 0.25 to 2 $h^{-1}$, 0.5 to 10 $h^{-1}$, 0.5 to 5 $h^{-1}$, or 0.5 to 2 $h^{-1}$.

The catalyst used in the first reaction zone 336 contains one or more active metal components selected from the Periodic Table of the Elements IUPAC Groups 6-10. In certain embodiments the active metal component is one or more of cobalt, nickel, tungsten and molybdenum, typically deposited or otherwise incorporated on a support, which can be amorphous and/or structured, such as alumina, silica-alumina, silica, titania, titania-silica, titania-silicates, or zeolites. In embodiments using zeolite-based catalysts, HPNA compounds have relatively greater tendency to accumulate in the recycle stream due to the inability for these larger molecules to diffuse into the catalyst pore structure, particularly at relatively lower hydrogen partial pressure levels in the reactor. However, according to the process herein, by removing HPNA compounds from the recycle stream in embodiments where HPNA-reduced bottoms are recycled to the first reaction zone 336, the lifecycle of such zeolite catalyst is increased.

Second reaction zone 340 can contain one or more fixed-bed, ebullated-bed, slurry-bed, moving bed, continuous stirred tank (CSTR), or tubular reactors in a series and/or parallel arrangement. The reactor(s) are operated under conditions effective for the particular type of reactor, the feed characteristics, and the desired product slate. For instance, these conditions can include a reaction temperature in the range of from about 300 to 500° C., 330 to 500° C., 300 to 475° C., 330 to 475° C., 300 to 475° C. or 330 to 450° C.; a reaction pressure in the range of from about 60 to 300 bar, 60 to 200 bar, 60 to 180 bar, 100 to 300 bar, 100 to 200 bar, 100 to 180 bar, 130 to 300 bar, 130 to 200 bar, or 130 to 180 bar; a hydrogen feed rate up to about 2500 SLt/Lt, in certain embodiments from about 800 to 2000 SLt/Lt, 800 to 1500 SLt/Lt, 1000 to 2000 SLt/Lt, or 1000 to 1500 SLt/Lt; and a feed rate in the range of from about 0.1 to 10 $h^{-1}$, 0.1 to 5 $h^{-1}$, 0.1 to 2 $h^{-1}$, 0.25 to 10 $h^{-1}$, 0.25 to 5 $h^{-1}$, 0.25 to 2 $h^{-1}$, 0.5 to 10 $h^{-1}$, 0.5 to 5 $h^{-1}$, or 0.5 to 2 $h^{-1}$.

The catalyst used in the second reaction zone 340 contains one or more active metal components selected from IUPAC Groups 6-10 of the Periodic Table of the Elements. In certain embodiments, the active metal component is one or more of cobalt, nickel, tungsten and molybdenum. In embodiments in which the first reaction zone reduces contaminants such as sulfur and nitrogen so that hydrogen sulfide and ammonia are minimized in the second reaction zone, active metal components effective as hydrogenation catalysts can include one or more noble metals such as platinum or palladium alone or in combination with other active metals. The active metal component(s) are typically deposited or otherwise incorporated on a support, which can be amorphous and/or structured, such as alumina, silica-alumina, silica, titania, titania-silica, titania-silicates, or zeolites.

In embodiments using zeolite-based catalysts, HPNA compounds have relatively greater tendency to accumulate in the recycle stream due to the inability of these larger molecules to diffuse into the catalyst pore structure, particularly at relatively lower hydrogen partial pressure levels in the reactor. However, according to the present process, by removing HPNA compounds from the recycle stream in embodiments where HPNA-reduced bottoms are recycled to the second reaction zone 340, the lifecycle of such zeolite catalyst is increased.

As noted above, heavy poly-nuclear aromatic compound formation is a major concern for hydrocracking unit operators. All known hydrocracking processes and catalysts are subject to undesirable side reactions leading to the formation of heavy poly-nuclear aromatic (HPNA) compounds, which accumulate in the unconverted oil recycle stream. These compounds are virtually impossible to convert by hydrocracking reactions and show a strong tendency to build up to high concentration levels in the recycle oil stream. As the concentration builds up, the performance of the reactor system is continuously degraded leading to inefficient and uneconomic conditions. These problems are addressed by the current process by the removal of HPNA molecules from the recycle stream by adsorption and ionic liquid extraction. The treated recycle stream that is substantially HPNA-free or HPNA-reduced will extend the efficient performance of the hydrocracking unit, catalyst activity, stability, and increase product yields and quality.

The process and system of the invention can advantageously be installed in an existing refinery as an integrated adsorption and extraction operation downstream of the hydrocracking systems, such as the ones described above in reference to FIGS. 1, 2 and/or 3, to remove HPNA compounds from the recycle stream to provide flexibility to refinery hydrocracking unit operations for removal of HPNA compounds from the recycle streams and avoid the need to purge a portion of the recycle stream, thereby improving the overall efficiency of the unit operation.

The HPNA separation zone 120, 220 and 320 integrated in hydrocracking systems 100, 200 and 300 described herein, and variations thereto which will be apparent to a person having ordinary skill in the art, is effective for removal of HPNA compounds from a bottoms recycle stream. These bottoms fractions contain HPNA compounds that were formed in the reaction zones, and are treated in the HPNA separation zone to separate HPNA compounds and produce the reduced-HPNA hydrocracked bottoms stream.

In accordance with the various embodiments herein, hydrocracked bottoms fractions containing HPNA compounds are subjected to ionic liquid extraction and adsorption, in either order, i.e., consistent with Embodiment 1 or Embodiment 2, under reaction conditions suitable to remove HPNA and form an HPNA-reduced hydrocracked bottoms fraction. The bottoms fraction is mostly naphthenic and paraffinic.

Figure 5:
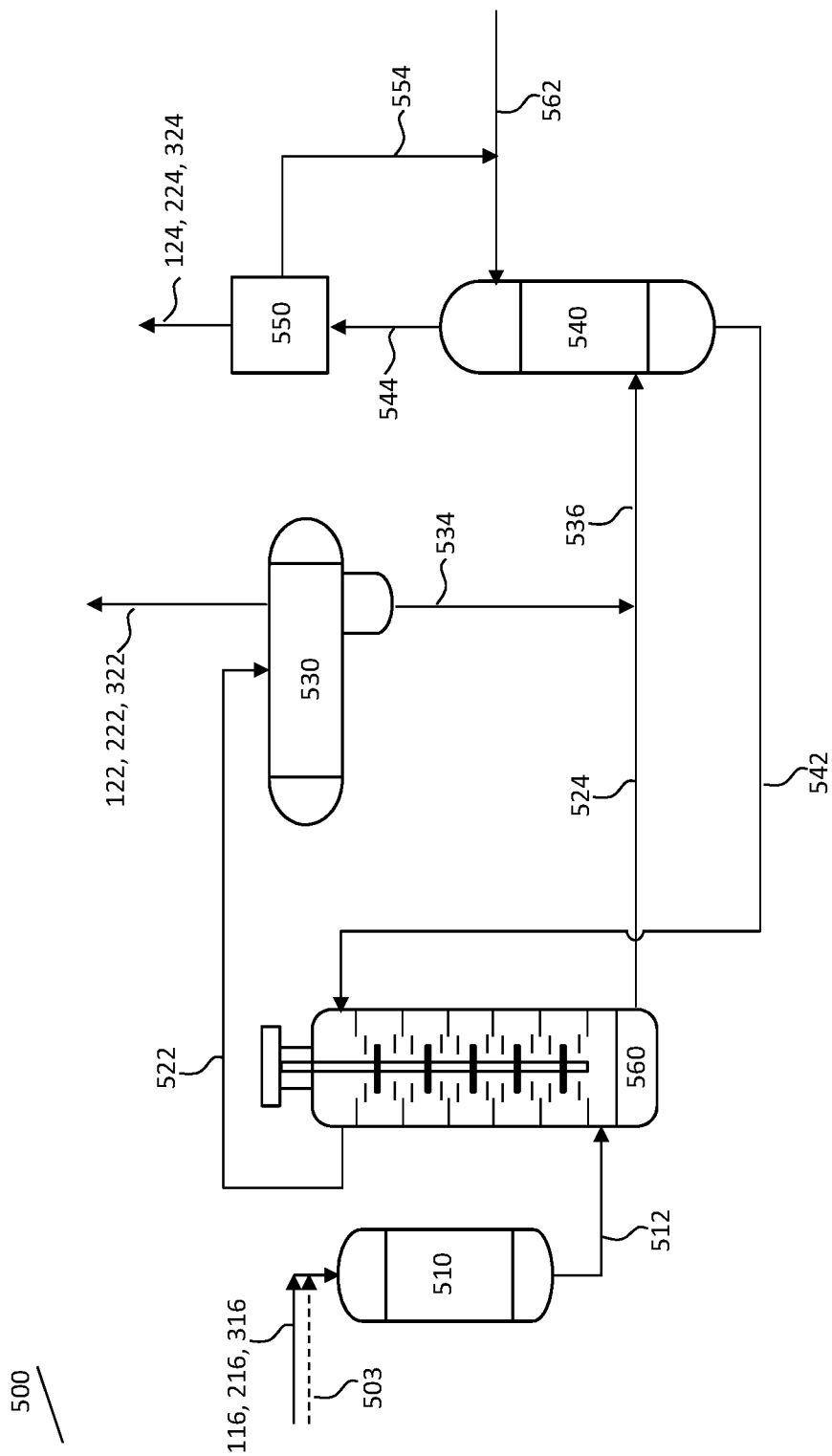
FIG. 5 is a process flow diagram of one embodiment of a system and process for the practice of the invention in which adsorption is followed by ionic liquid extraction.

Referring to FIG. 5, a process and system 500 for the removal of HPNA from a hydrocracker recycle stream and feed is schematically illustrated that includes an adsorption zone, an ionic liquid extractor zone, and separation zones. It will be understood that process and system 500 can be any of 120, 220, or 320 that were described above.

The adsorption zone 510 includes an inlet for receiving a hydrocracker residuals feed 116, 216 or 316 that is rich in HPNAs/HPNA precursors, and hydrocracker bottoms recycle stream 503. An effluent 512 from the adsorption column 510, that has had most of the HPNAs and HPNA precursors removed, is sent to the inlet of an extractor 560. Extractor 560 also has an inlet for receiving ionic liquid stream 542 consisting of one or more ionic liquids. Extractor 560 extracts the remaining HPNAs/HPNA precursors from the hydrocarbon oil with ionic liquids.

The extracted HPNAs/HPNA precursors from extractor 560 are sent with the ionic liquids via stream 524 to an inlet in solvent extractor 540. Extractor 540 uses an organic polar solvent, introduced via solvent stream 562, to separate the HPNAs/HPNA precursors from the ionic liquids. The ionic liquids recovered are recycled via stream 542 to the extractor 560. Remaining solvent and HPNAs/HPNA precursors are sent from solvent extractor 540 via stream 544 to solvent recovery unit 550, where the solvent is recovered and recycled via stream 554 back to the solvent extractor 540. The remaining HPNAs/HPNA precursors are recovered via stream 124, 224, or 324 from the solvent recovery unit.

The treated stream 522, that has substantially no free HPNAs/HPNA precursors or ionic liquids, is sent from extractor 560 to a liquid-liquid separator 530. Any remaining ionic liquids and HPNAs/HPNA precursors are separated from the rest of the hydrocarbon stream and are discharged via stream 534 from the liquid-liquid separator 530. HPNA compounds and HPNA precursors and ionic liquid stream 534 is mixed with HPNAs/HPNA precursors and ionic liquid stream 524 before being sent to solvent extractor 540. A HPNA-reduced fractionator bottoms 122, 222, or 322 is then substantially free of HPNAs/HPNA precursors and can be recovered as the feed to the hydrocracking unit (not shown).

Figure 6:
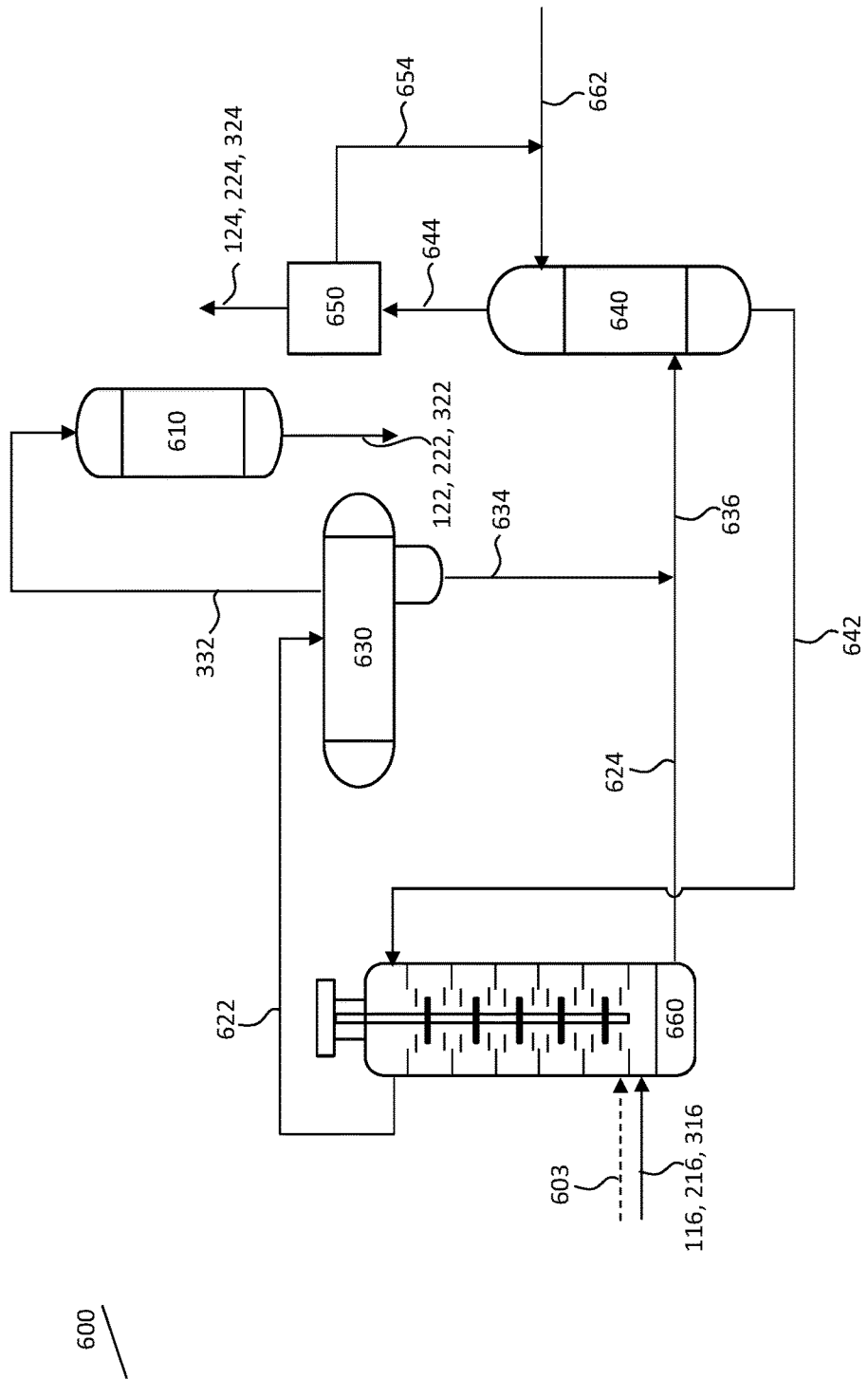
FIG. 6 is a process flow diagram of another embodiment of a system and process for the practice of the invention in which ionic extraction precedes the adsorption step.

Referring to FIG. 6, a process and system 600 for the removal of HPNA compounds and HPNA precursors from a hydrocracker feed is schematically illustrated. The system includes an ionic liquid extraction zone, an adsorption zone, and separation zones. It will be understood that process and system 600 can be any of 120, 220, or 320 that were described above.

The ionic liquid extraction zone includes extractor 660 that has an inlet for receiving a hydrocracker residuals feed 116, 216, or 316 that is rich in HPNA compounds and HPNA precursors, ionic liquid stream 642, and hydrocracker bottoms recycle stream 603. Extractor 660 extracts most of the HPNA compounds and HPNA precursors with ionic liquids.

The extracted HPNAs/HPNA precursors from extractor 660 are sent with the ionic liquids via stream 624 to an inlet of a solvent extractor 640. Extractor 640 uses a polar organic solvent, introduced via solvent stream 662, to separate the HPNAs/HPNA precursors from the ionic liquids. The ionic liquids recovered are recycled via stream 642 to the extractor 660. Remaining solvent and HPNAs/HPNA precursors are sent from solvent extractor 640 via stream 644 to solvent recovery unit 650, where the solvent is recovered and recycled via stream 654 back to the solvent extractor 640. The remaining HPNAs/HPNA precursors are recovered via stream 124, 224, or 324 from the solvent recovery unit.

The treated stream 622 that has had most of the HPNAs/HPNA precursors and ionic liquids removed is sent from extractor 660 to a liquid-liquid separator 630. Remaining ionic liquids and HPNAs/HPNA precursors are separated from the hydrocarbon stream and are discharged via stream 334 from the liquid-liquid separator 630. HPNAs/HPNA precursors and ionic liquid stream 334 is mixed with HPNAs/HPNA precursors and ionic liquid stream 624 before being sent to solvent extractor 340.

Stream 632, having a substantially reduced content of HPNAs/HPNA precursors, is sent to adsorption column 610 to remove any remaining HPNAs/HPNA precursors or ionic liquids. A fractionator bottoms stream 122, 222, or 322 from the adsorption column 610 that is substantially free of HPNAs/HPNA precursors is recovered for use as the feed to the hydrocracking unit.

EXAMPLES

The following laboratory examples demonstrate the effectiveness of the process in separating HPNA compounds and precursors from hydrocracker bottoms.

Example 1

Ionic Liquid Extraction

A mixture of 80 grams of hydrocracking unit bottoms and 20 grams of the ionic liquid, 1-butyl-3-methylimidazolium-hexafluoro phosphate was heated to 50° C. and continuously stirred for 30 minutes at 50° C. Thereafter, 100 cc of pentane was added to the mixture with stirring to assure thorough contact of the constituents. The mixture was transferred to a separatory funnel to separate the ionic liquid and oil-pentane mixture. The pentane was evaporated from the oil-pentane mixture in a rotary evaporator and the treated hydrocracking unit bottom stream was recovered. The material balance for the example is shown in Table 1.

Example 2

Ionic Liquid Extraction Followed by Adsorption

A mixture of 80 grams of hydrocracking unit bottoms and 20 grams of the ionic liquid, 1-butyl-3-methylimidazolium-hexafluoro phosphate was heated to 50° C. and continuously stirred for 30 minutes at 50° C. Thereafter, 100 cc of pentane was added to the mixture with stirring to assure thorough contact of the constituents. The mixture was transferred to a separatory funnel to separate the ionic liquid and the oil-pentane mixture. The oil-pentane mixture was passed thru a column containing 60 grams of attapulgus clay. The column effluents are collected and more pentane was added until a colorless effluent was obtained from the column. The pentane was evaporated in a rotary vaporator and a treated hydrocracker bottom stream was obtained. The material balance for this example is shown in Table 1.

Example 3 Adsorption Followed by Ionic Liquid Extraction

A mixture of 80 grams of hydrocracking unit bottoms and 100 cc of pentane was stirred to dissolve the oil. The solution was passed thru a column containing 60 grams of attapulgus clay. The column effluents were collected and more pentane was added until a colorless effluent was obtained from the column all of which were collected and mixed with 20 grams of the ionic liquid, 1-butyl-3-methylimidazolium-hexafluoro phosphate. The mixture was heated and maintained at 50° C. with continuous stirring for 30 minutes. The mixture was transferred to a separatory funnel for separation of the ionic liquid from the oil phase. The pentane was evaporated in a rotary vaporator and the treated hydrocracker bottom stream was recovered. The material balance for this example is shown in Table 1.

TABLE 1

Material Balance

| | Example | | |
|---|---|---|---|
| | 1 | 2 | 3 |
| Hydrocracker bottoms | 80.0 | 80.5 | 80.3 |
| Ionic Liquid* | 20.0 | 20.1 | 20.1 |
| Total In | 100.0 | 100.6 | 100.4 |
| Treated Hydrocracker Bottoms | 80.1 | 80.1 | 78.3 |
| Ionic Liquid* plus extract | 16.6 | 17.8 | 17.1 |
| Total out | 96.7 | 97.9 | 95.4 |
| MB % | 96.7 | 97.3 | 95.0 |

As noted above, the ionic liquid employed was 1-butyl-3-methylimidazolium-hexaflouro phosphate.

Figure 4:
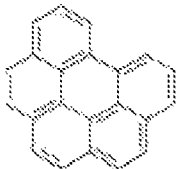
FIG. 4 is a table identifying and illustrating the structures of various heavy poly-nuclear aromatic compounds typical of those produced during hydrocracking processes.
Figure 4:
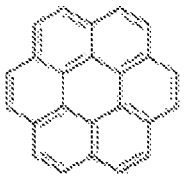
Figure 4:
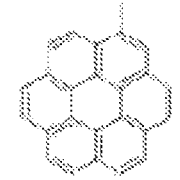
Figure 4:
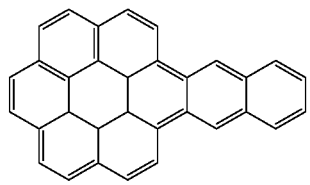
Figure 4:
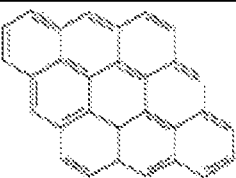
Figure 4:
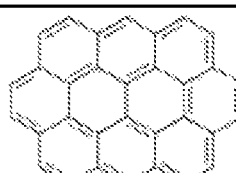

The products from Examples 1 and 2 were analyzed for HPNA molecules using high pressure liquid chromatography (HPLC) methods. The results are summarized in Tables 2, 3 and 4. The structure of these molecules are shown in FIG. 4.

TABLE 2

HPNA distribution for Example 1

| HPNAs | Ring # | Feed ppmw | Product ppmw | Removal Rate W % |
|---|---|---|---|---|
| Benzoperylene | 6 | 1540 | 1421 | 7.7 |
| Coronene | 7 | 201 | 194 | 3.3 |
| Methylcoronene | 7 | 204 | 196 | 3.7 |
| Naphthenocoronene | 7 | 79 | 80 | −0.9 |
| Dibenzocoronene | 9 | 26 | 24 | 7.5 |
| Ovalene | 10 | 15 | 13 | 12.1 |
| | | 2065 | 1928 | 6.6 |

TABLE 3

HPNA distribution for Example 2

| HPNAs | Ring # | Feed ppmw | Product ppmw | Removal Rate W % |
|---|---|---|---|---|
| Benzoperylene | 6 | 1540 | 1266 | 17.8 |
| Coronene | 7 | 201 | 135 | 33.1 |
| Methylcoronene | 7 | 204 | 111 | 45.4 |
| Naphthenocoronene | 7 | 79 | 49 | 38.1 |
| Dibenzocoronene | 9 | 26 | 4 | 85.1 |
| Ovalene | 10 | 15 | 2 | 88.6 |
| Total | | 2065.0 | 1567 | 24.1 |

TABLE 4

HPNA distribution for Example 3

| HPNAs | Ring # | Feed ppmw | Product ppmw | Removal Rate W % |
|---|---|---|---|---|
| Benzoperylene | 6 | 1540 | 1099 | 28.6 |
| Coronene | 7 | 201 | 103 | 48.8 |
| Methylcoronene | 7 | 204 | 87 | 57.5 |
| Naphthenocoronene | 7 | 79 | 38 | 51.5 |
| Dibenzocoronene | 9 | 26 | 3 | 90.2 |
| Ovalene | 10 | 15 | 1 | 92.6 |
| Total | | 2065 | 1331 | 35.5 |

The most difficult HPNA compounds to process in the hydrocracking unit are the molecules formed from 10 or more condensed aromatic rings. As shown in Table 2, the 10-ring ovalene removal rate is only 12 W % following ionic liquid extraction. However, when the adsorption step is added to the ionic liquid extraction step in the two-stage treatment, as much as 92 W % of the ovalenes were removed from the hydrocracking bottoms stream.

The combined adsorption followed by extraction steps and the extraction followed by adsorption steps of the processes described above are both highly efficient and effective in removing substantially all of the HPNA compounds and HPNA precursors without significant loss of the feed and/or hydrocracker bottom recycle stream.

The method and system of the present invention have been described above and in the attached drawings; however, modifications will be apparent to those of skill in the art and the scope of protection for the invention is to be determined by the claims that follow.

What is claimed is:

1. A process for the treatment of a hydrocracking unit bottoms stream obtained from a hydrocracking operation containing heavy poly-nuclear aromatic (HPNA) compounds that are derived from the hydrocracking operation prior to use within the hydrocracking operation to reduce the content of HPNA compounds, the process comprising:
   a. contacting the bottoms stream from the hydrocracking operation with an effective amount of adsorbent material in an adsorption vessel to produce an adsorbent-treated bottoms stream having a reduced content of HPNA compounds;
   b. recovering and introducing the adsorbent-treated bottoms stream into an extraction unit with one or more ionic liquids for a predetermined time to extract the HPNA compounds and produce an extraction unit effluent stream containing extracted HPNA compounds and ionic liquid, and an ionic liquid treated stream having a reduced content of HPNA compounds and residual ionic liquid;
   c. recovering and introducing the effluent stream from the extraction unit containing the extracted HPNA compounds and ionic liquid into a separation unit for contact with an organic polar solvent;
   d. maintaining the extraction unit effluent stream from the extraction unit containing extracted HPNA compounds and ionic liquid in the separation unit for a time that is sufficient to form a solution of the HPNA compounds in the organic polar solvent;
   e. recovering ionic liquid from the separation unit for re-use in the extraction unit, and discharging a stream containing solvent and HPNA compounds stream;
   f. transferring the stream containing solvent and HPNA compounds to a solvent recovery unit, and recovering a solvent stream for re-use in the separation unit;
   g. transferring from the extraction unit the ionic liquid treated stream having reduced HPNA compounds to a liquid-liquid separator and recovering as separate streams
      (i) an ionic liquid treated hydrocarbon stream having a substantially reduced content of HPNA compounds, and
      (ii) a stream containing residual ionic liquid and HPNA compounds; and
   h. using all or a portion of the treated hydrocarbon stream having a substantially reduced content of HPNA compounds as feed within the hydrocracking operation.

2. The process of claim 1 in which a fresh hydrocracking unit feed is combined with the hydrocracking unit bottoms stream, prior to the contacting with adsorbent in the adsorption vessel, to produce a combined stream, and wherein the combined stream is treated in the adsorption vessel.

3. The process of claim 1 in which the one or more ionic liquids is of the general formula $Q^+ A^-$,
   wherein the $A^-$ ion is selected from the group consisting of halide anions, nitrate, sulfate, phosphate, acetate, haloacetates, tetrafluoroborate, tetrachloroborate, hexafluorophosphate, hexafluoroantimonate, fluorosulfonate, alkyl sulfonates, perfluoroalkyl sulfonates, bis(perfluoroalkylsulfonyl)amides, tris-trifluoromethanesulfononyl methylide of the formula $C(CF_3SO_2)_3{-}$, unsubstituted arenesulfonates, arenesulfonates substituted by halogen or haloalkyl groups, and
   wherein the $Q^+$ ion is an ammonium cation, a phosphonium cation or a sulfonium cation that will form a liquid compound with an $A^-$ ion.

4. The process of claim 3 in which the one or more ionic liquids is selected from the group consisting of N-butyl-pyridinium hexafluorophosphate, N-ethyl-pyridinium tetrafluoroborate, pyridinium fluorosulfonate, butyl-3-methyl-1-imidazolium tetrafluoroborate, butyl-3-methyl-1-imidazolium bis-trifluoromethane-sulfonyl amide, triethylsulfonium bis-trifluoromethane-sulfonyl amide, butyl-3-methyl-1-imidazolium hexafluoro-antimonate, butyl-3-methyl-1-imidazolium hexafluorophosphate, butyl-3-methyl-1-imidazolium trifluoroacetate, butyl-3-methyl-1-imidazolium trifluoromethylsulfonate, butyl-3-methyl-1-imidazolium bis(trifluoromethylsulfonyl)-amide, trimethylphenylammonium hexafluorophosphate, tetrabutylphosphonium tetrafluoroborate, and mixtures thereof.

5. The process of claim 1 in which the extraction unit operates at a temperature in the range of from 20° to 200° C., a pressure in the range of from 1 to 30 bars, and at a mole ratio of ionic liquid-to-HPNA in the range of from 1:1 to 10:1.

6. The process of claim 1 in which the extraction unit is selected from the group consisting of tray columns, spray columns, packed towers, rotating disc contactors and pulse columns.

7. The process of claim 1 in which the adsorbent material is in an adsorption column in the form of a packed bed or slurry bed.

8. The process of claim 7 in which the adsorption column operates at a temperature in the range of from 20° to 200° C. and a pressure in the range of from 1 to 30 bars.

9. The process of claim 1 in which the adsorbent material is selected from the group consisting of attapulgus clay, alumina, silica, activated carbon, natural and synthetic zeolites, spent catalysts, silica-titania and titania.

10. The process of claim 1 in which the organic polar solvent has an overall solubility parameter greater than about 8.5.

11. The process of claim 9 in which the organic polar solvent is selected from the group consisting of toluene, benzene, xylene, tetrahydrofuran, and mixtures thereof.

12. A process for the treatment of a hydrocracking unit bottoms stream obtained from a hydrocracking operation containing heavy poly-nuclear aromatic (HPNA) compounds that are derived from the hydrocracking operation prior to use within the hydrocracking operation to reduce the content of HPNA compound, the process comprising:
   a. introducing the bottoms stream from the hydrocracking operation into an extraction unit with one or more ionic liquids for a predetermined period of time to extract the HPNA compounds and to produce an extraction unit effluent stream containing extracted HPNA compounds and ionic liquid, and an ionic liquid treated stream having a reduced content of HPNA compounds and residual ionic liquid;

b. introducing the extraction unit effluent stream containing the extracted HPNA compounds and ionic liquid into a separation unit for contact with an organic polar solvent;

c. mixing the extraction unit effluent stream containing the extracted HPNA compounds and ionic liquid in the separation unit for a time that is sufficient to form a solution of the HPNA compounds in the organic polar solvent;

d. recovering ionic liquid from the separation unit for re-use in the extraction unit and discharging a stream containing solvent and HPNA compounds;

e. transferring the stream containing solvent and HPNA compounds to a solvent recovery unit, and recovering a solvent stream for re-use in the separation unit;

f. transferring from the extraction unit the ionic liquid treated stream having a reduced content of HPNA compounds to a liquid-liquid separator and recovering as separate streams
   (i) an ionic liquid treated hydrocarbon stream having a substantially reduced content of HPNA compounds, and
   (ii) a stream containing residual ionic liquid and HPNA compounds;

g. contacting the ionic liquid treated hydrocarbon stream with an effective amount of adsorbent material to produce an adsorbent-treated hydrocarbon stream having a reduced content of HPNA compounds;

h. recovering the adsorbent-treated stream having a reduced content of HPNA compounds; and i. using all or a portion of the adsorbent-treated stream having a reduced content of HPNA compounds as feed within the hydrocracking operation.

13. The process of claim 12, in which a fresh hydrocracking unit feed is combined with the hydrocracking unit bottoms stream, prior to the introduction into the extraction unit, to produce a combined stream, and wherein the combined stream is treated in the extraction unit.

14. The process of claim 12 in which the one or more ionic liquids is of the general formula $Q^+ A^-$,
   wherein the $A^-$ ion is selected from the group consisting of halide anions, nitrate, sulfate, phosphate, acetate, haloacetates, tetrafluoroborate, tetrachloroborate, hexafluorophosphate, hexafluoroantimonate, fluorosulfonate, alkyl sulfonates, perfluoroalkyl sulfonates, bis(perfluoroalkylsulfonyl)amides, tris-trifluoromethanesulfononyl methylide of the formula $C(CF_3SO_2)_3^-$, unsubstituted arenesulfonates, arenesulfonates substituted by halogen or haloalkyl groups, and
   wherein the $Q^+$ ion is an ammonium cation, a phosphonium cation or a sulfonium cation that will form a liquid compound with an $A^-$ ion.

15. The process of claim 14 in which the one or more ionic liquids is selected from the group consisting of N-butyl-pyridinium hexafluorophosphate, N-ethyl-pyridinium tetrafluoroborate, pyridinium fluorosulfonate, butyl-3-methyl-1-imidazolium tetrafluoroborate, butyl-3-methyl-1-imidazolium bis-trifluoromethane-sulfonyl amide, triethylsulfonium bis-trifluoromethane-sulfonyl amide, butyl-3-methyl-1-imidazolium hexafluoro-antimonate, butyl-3-methyl-1-imidazolium hexafluorophosphate, butyl-3-methyl-1-imidazolium trifluoroacetate, butyl-3-methyl-1-imidazolium trifluoromethylsulfonate, butyl-3-methyl-1-imidazolium bis(trifluoromethylsulfonyl)-amide, trimethylphenylammonium hexafluorophosphate, tetrabutylphosphonium tetrafluoroborate, and mixtures thereof.

16. The process of claim 12 in which the extraction unit operates at a temperature in the range of from 20° to 200° C., a pressure in the range of from 1 to 30 bars, and at a mole ratio of ionic liquid-to-HPNA in the range of from 1:1 to 10:1.

17. The process of claim 12 in which the extraction unit is selected from the group consisting of tray columns, spray columns, packed towers, rotating disc contactors and pulse columns.

18. The process of claim 12 in which the adsorbent material is in an adsorption column in the form of a packed bed or slurry bed.

19. The process of claim 18 in which the adsorption column operates at a temperature in the range of from 20° to 200° C. and a pressure in the range of from 1 to 30 bars.

20. The process of claim 12 in which the adsorbent material is selected from the group consisting of attapulgus clay, alumina, silica, activated carbon, natural and synthetic zeolites, spent catalysts, silica-titania and titania.

21. The process of claim 12 in which the organic polar solvent has an overall solubility parameter greater than about 8.5.

22. The process of claim 21 in which the organic polar solvent is selected from the group consisting of toluene, benzene, xylene, tetrahydrofuran, and mixture thereof.

23. A two stage hydrocracking process as the hydrocracking operation of claim 1 comprising:
   subjecting a hydrocarbon stream to a first hydrocracking stage to produce a first hydrocracked effluent;
   fractionating the first hydrocracked effluent to recover one or more hydrocracked product fractions and a bottoms fraction corresponding to the hydrocracking unit bottoms stream of claim 1;
   and
   wherein using all or a portion of the treated hydrocarbon stream having a substantially reduced content of HPNA compounds within the hydrocracking operation comprises passing all or a portion of the treated hydrocarbon stream having a substantially reduced content of HPNA compounds to a second hydrocracking stage to produce a second hydrocracked effluent.

24. The process as in claim 23, wherein the second hydrocracked effluent is fractionated with the first hydrocracked effluent.

25. A single-stage or series flow hydrocracking process as the hydrocracking operation of claim 1 comprising:
   subjecting a hydrocarbon stream to a hydrocracking zone in a single stage hydrocracking process, or one or more hydrocracking zones in series in a series flow hydrocracking process, to produce a hydrocracked effluent;
   fractionating the hydrocracked effluent to recover one or more hydrocracked product fractions and a hydrocracked bottoms fraction corresponding to the hydrocracking unit bottoms stream of claim 1;
   wherein using all or a portion of the treated hydrocarbon stream having a substantially reduced content of HPNA compounds within the hydrocracking operation comprises recycling all or a portion of the treated hydrocarbon stream having a substantially reduced content of HPNA compounds to the hydrocracking zone in a single stage hydrocracking process, or at least one of the one or more hydrocracking zones in a series flow hydrocracking process.

26. A two stage hydrocracking process as the hydrocracking operation of claim 12 comprising:
   subjecting a hydrocarbon stream to a first hydrocracking stage to produce a first hydrocracked effluent;
   subjecting a hydrocarbon stream to a first hydrocracking stage to produce a first hydrocracked effluent;
   fractionating the first hydrocracked effluent to recover one or more hydrocracked product fractions and a bottoms fraction corresponding to the hydrocracking unit bottoms stream of claim 12;
   and
   wherein using all or a portion of the adsorbent-treated stream having a reduced content of HPNA compounds within the hydrocracking operation comprises passing all or a portion of the adsorbent-treated stream having a reduced content of HPNA compounds to a second hydrocracking stage to produce a second hydrocracked effluent.

27. The process as in claim 26, wherein the second hydrocracked effluent is fractionated with the first hydrocracked effluent.

28. A single-stage or series flow hydrocracking process as the hydrocracking operation of claim 12 comprising:
   subjecting a hydrocarbon stream to a hydrocracking zone in a single stage hydrocracking process, or one or more hydrocracking zones in a series in a series flow hydrocracking process, to produce a hydrocracked effluent;
   fractionating the hydrocracked effluent to recover one or more hydrocracked product fractions and a hydrocracked bottoms fraction corresponding to the hydrocracking unit bottoms stream of claim 12;
   wherein using all or a portion of the adsorbent-treated stream having a reduced content of HPNA compounds within the hydrocracking operation comprises recycling all or a portion of the adsorbent-treated stream having a reduced content of HPNA compounds to the hydrocracking zone in a single stage hydrocracking process, or at least one of the one or more hydrocracking zones in a series flow hydrocracking process.

29. The process as in claim 1, wherein the stream containing residual ionic liquids and HPNA compounds from the liquid-liquid separator is passed to the separation unit for contact with organic solvent.

30. The process as in claim 12, wherein the stream containing residual ionic liquids and HPNA compounds from the liquid-liquid separator is passed to the separation unit for contact with organic solvent.

* * * * *